United States Patent [19]
Nakamura

[11] Patent Number: 5,887,912
[45] Date of Patent: Mar. 30, 1999

[54] FLARE-TYPE PIPE JOINT

[75] Inventor: Tuneyoshi Nakamura, Tokyo, Japan

[73] Assignee: Three Bond Co., Ltd., Tokyo, Japan

[21] Appl. No.: 843,844

[22] Filed: Apr. 17, 1997

[30] Foreign Application Priority Data

Apr. 19, 1996 [JP] Japan ................................ 8-134071

[51] Int. Cl.$^6$ ................................................ F16L 25/00
[52] U.S. Cl. .................................... 285/334.5; 285/293.1; 285/910; 29/890.14
[58] Field of Search ............................. 277/945, 617, 277/625; 29/890.14; 285/910, 293.1, 332.2

[56] References Cited

U.S. PATENT DOCUMENTS

| 3,024,047 | 3/1962 | Schmohl | 285/332.2 |
| 3,843,764 | 10/1974 | Grawey et al. | 285/910 X |
| 4,570,981 | 2/1986 | Fournier | 285/910 X |

FOREIGN PATENT DOCUMENTS

| 55-13716 | 1/1980 | Japan | C09K 3/10 |
| 2-122288 | 10/1990 | Japan | F16L 19/04 |
| 6-34084 | 2/1994 | Japan | F16L 19/04 |
| 6-63983 | 9/1994 | Japan | F16L 19/04 |

*Primary Examiner*—Dave W. Arola
*Attorney, Agent, or Firm*—Sughrue, Mion, Zinn, Macpeak & Seas, PLLC

[57] ABSTRACT

In order to improve the reliability of sealing property of a flare-type pipe joint, a flare-type pipe joint is designed such that a sealing material composition containing thermosetting resin, a curing agent, and fluororesin powder is applied onto a conical flange surface which abuts on a flare portion and then subjected to heat treatment so that the sealing material composition is subjected to crosslinking reaction to thereby form an elastic sealing layer. Further, it is preferable that the fluororesin powder is non-sintered fluororesin powder which is not subjected to crystallizing treatment made by sintering process.

13 Claims, 1 Drawing Sheet

FLARE-TYPE PIPE JOINT

BACKGROUND OF THE INVENTION

The present invention generally relates to a flare-type pipe joint, and particularly relates to a flare-type pipe joint which is suitable for use for air/oil piping in a vehicle.

In a vehicle, piping of brake tubes, fuel pipes, and the like, is performed. In order to facilitate assembling work or arrangement of piping, a flare-type pipe joint constituted by a pair of pipes, one having a tranpet-shaped flare portion and the other having a conical flange surface, is used as the pipe joint.

This flare-type pipe joint is configured such that the flare portion abuts on the conical flange surface so as to seal pipes with each other. The technique for improving the reliability of the sealing property of the abutment portions is disclosed in Japanese Utility Model Unexamined Publication Nos. Hei-6-63983 and Hei-2-122288, and Japanese Patent Unexamined Publication No. Hei-6-34084, etc.

The above Japanese Utility Model Unexamined Publication No. Hei-6-63983 discloses a technique in which an enlarged diameter portion is formed on a part of a conical flange surface to thereby give a mechanical elastic means to the flange surface. The above Japanese Utility Model Unexamined Publication No. Hei-2-122288 discloses a packing which is buried into a pipe inner hole of a conical flange. The above Japanese Patent Unexamined Publication No. Hei-6-34084 discloses a technique in which a groove is provided in a conical flange surface and an O-ring is fitted in the groove.

If an elastic portion is provided on a conical flange surface and the flange surface is made to abut on a flare portion as described in the above technique, the reliability of sealing is improved. In the above Japanese Utility Model Unexamined Publication No. Hei-2-122288 and Japanese Patent Unexamined Publication No. Hei-6-34084, however, there has been such a disadvantage that the number of parts increases because of requirement of a sealing material such as a packing or an O-ring.

In the above Japanese Utility Model Unexamined Publication No. Hei-6-63983, since the conical flange surface abuts directly on the flare portion, it is necessary to make the surface processing high in accuracy with respect to both the surfaces. Further, in the above Japanese Patent Unexamined Publication No. Hei-6-34084, since a groove for an O-ring is provided, it is necessary to further provide a cutting step.

SUMMARY OF THE INVENTION

In view of the foregoing disadvantages, the present invention provides a flare-type pipe joint, characterized in that a sealing material composition containing thermosetting resin, a curing agent, and fluororesin powder is applied onto at least one of a conical flange surface and a flare portion which abut against each other and then subjected to heat treatment so that the sealing material composition is subjected to crosslinking reaction to thereby form an elastic sealing layer which is provided on the conical flange surface. Here, it is preferable that among constituent components of the sealing material composition, the fluororesin powder is non-sintered fluororesin powder which is not subjected to crystallizing treatment made by sintering process.

DETAILED DESCRIPTION OF THE PREFERRED EMBODIMENT

Figure 1:
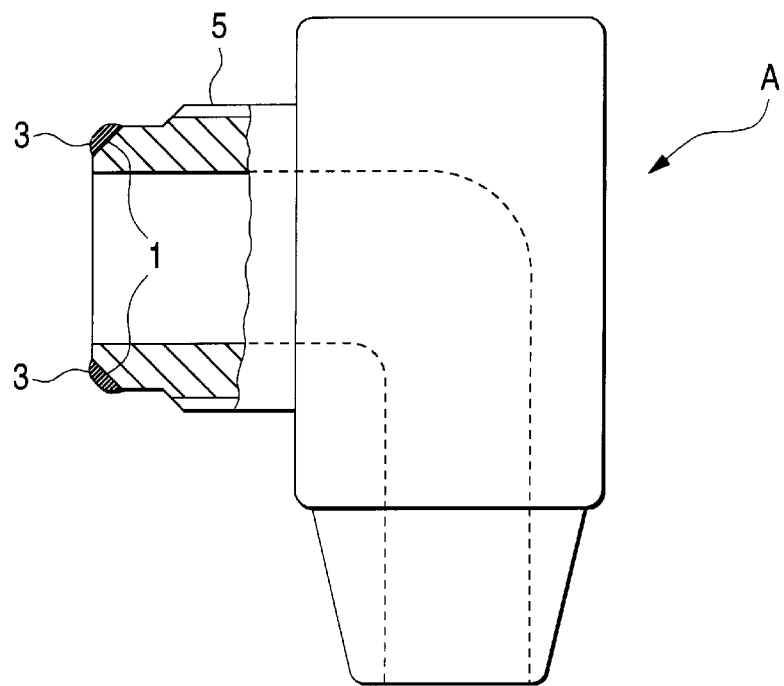
FIG. 1 is a partially sectional view showing a conical flange of a flare-type joint according to an embodiment of the present invention.
Figure 2:
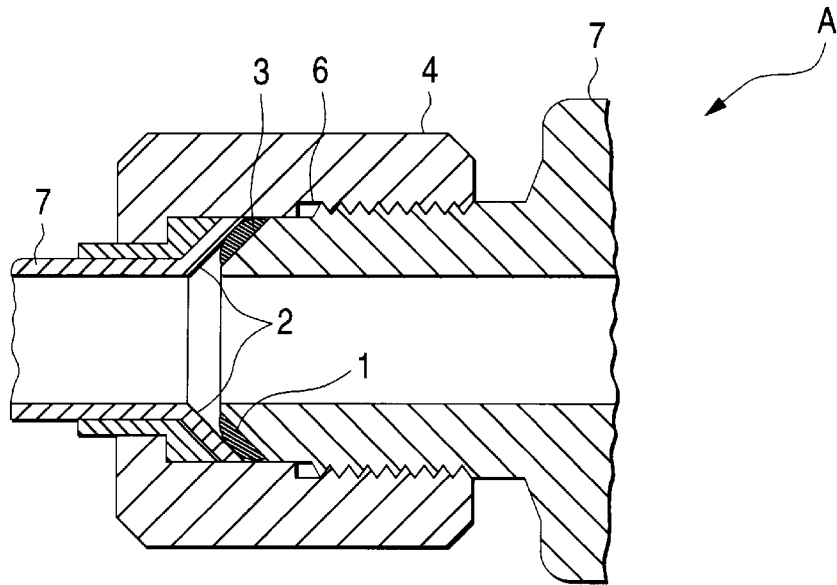
FIG. 2 is a sectional view showing the flare-type joint in the connected state according to the embodiment of the present invention.

FIGS. 1 and 2 illustrate a flare type pipe joint A, which constitutes an embodiment of the present invention. The flare type pipe joint A includes a first pipe 7 having a flared portion 2 at one end, and a second pipe 7 having a conical flange 1. The first and second pipes 7,7 are fastened together by means of male and female threads formed on the second pipe 7 and a nut 4, respectively. An elastic sealing layer 3 made from a specific sealing material composition is provided on the conical flange 1. In case where the sealing material composition is applied to the conical flange 1, it is preferable that the sealing material composition is applied only to a surface of the conical flange 1 where it abuts against the flared portion 2 when the first and second pipes 7, 7 are fastened together.

The sealing material composition is applied onto a conical flange 1 and heated so as to form a baked coating.

In formation of the sealing layer 3, the sealing material composition is applied onto the conical flange 1, air-dried at a room temperature, and then heated. It is preferable to select the heating temperature to be from about 70° to about 130° C. although this value depends on the kind of the thermosetting resin and the curing agent therefor of the sealing material composition.

The sealing material composition may be applied by means of a transfer system or a nozzle ejection system. Further, it is preferable to select the thickness of the sealing layer 3 to be not smaller than 200 μm. When the value is smaller than 200 μm, the elasticity is reduced to thereby lower the reliability in sealing and, as a result, it becomes difficult to repeatedly use a joint.

The flare-type joint which is high in reliability of sealing effect according to the present invention can be obtained simply through a process in which the specific sealing material composition is applied onto the conical flange surface, and then subjected to heat treatment at a predetermined temperature. Here, a sealing material composition suitable for the present invention is a composition containing, as its constituent components, thermosetting resin, a curing agent therefor, and fluororesin powder.

The fluororesin powder of the sealing material composition according to the present invention acts so as to lower the coefficient of friction of the surface of the elastic sealing layer. For example, even if the temperature of a pipe joint portion becomes abnormally high during driving of a vehicle, the elastic sealing layer of the conical flange surface is neither fused nor adhered to the flare portion. Further, during disassembly for a regular inspection, the pipe joint can be removed without damaging the surface of the elastic sealing layer because the elastic sealing layer is free from the fusion-adhesion to the flare portion. That is, since the elastic sealing layer of the conical flange surface is not damaged and hence the reliability of the sealing effect is not lowered, the pipe joint can be used repeatedly.

As the foregoing fluororesin powder, fluororesin such as polytetrafluoroethylene, a copolymer of tetrafluoroethylene and hexafluoropropylene, a copolymer of tetrafluoroethylene and ethylene, polychlorotrifluoroethylene, or the like, can be used.

As the fluororesin powder suitable for the present invention, it is preferable to use non-sintered fluororesin powder in which a polymer molecule is not crystallized by the sintering process. Since the non-sintered fluororesin powder is softer than crystallized, sintered fluororesin powder, elasticity for improved compression-restoration rate can be applied to the elastic sealing layer. Therefore, even in the case of strongly fastening the flare joint for a long time, the joint can be repeatedly used by the excellent compression-restoration rate. In this connection, when the sealing material composition applied onto the conical flange surface is subjected to heat treatment so as to present a crosslinking structure, the heat treatment is carried out under a temperature lower than a temperature in which the fluororesin powder is sintered and crystallized. In case of polytetrafluoroethylene, it is sintered by the heat of 200° C. to 400° C.

Here, the fluororesin powder is not necessary to be fine particles and it is sufficient that the fluororesin powder is short fibrous, for example, formed to be short fibers of 500μ or less.

The thermosetting resin and the curing agent therefor which are the other necessary components of the sealing material composition according to the present invention are a combination of acrylic resin and a curing agent therefor, or combination of epoxy resin and a curing agent therefor. As the curing agent for acrylic resin, a polybasic acid compound which is subjected to crosslinking reaction on acrylic resin through dehydration condensation may be used, and a radical seed generation compound such as a peroxide, an azo compound, a polythiol compound, or the like, which is subjected to crosslinking through a hydrogen-abstraction reaction or a radical addition reaction may be used. As the curing agent for epoxy resin, a compound such as an amine compound, an imidazole compound, an amide compound, or the like, having an active hydrogen group, or a salt compound of the abovementioned compounds, or the like, may be used.

As an example, resin such as alkyl ester acrylate such as polymethyl methacrylate or an acrylic ester copolymer is combined with a polybasic acid compound which is a condensation reactant of a dicarboxylic acid such as a phthalic acid and a maleic acid.

Further, Japanese Patent Unexamined Publication No. Sho 55-13716 discloses the sealing material composition including fluororesin powder. However, if a sealing layer is formed on a conical flange surface by using the sealing material composition of this technique, the sealing layer is fused and adhered to a flare portion when the temperature becomes high because the sealing layer is thermoplastic, so that it becomes difficult to remove a flare-type pipe joint.

According to the present invention, the thermosetting resin which is a component of the sealing material composition is denatured or converted into thermosetting plastics in which polymer molecules are mutually crosslinked to one another by the bake-adhesion step of the heat treatment so as not to be fused again, and, consequently, the fuse-adhesion to the flare portion can be positively avoided. That is, by the mutual function between the foregoing fluororesin powder and the thermosetting resin, it is possible to provide a flare-type joint which is easily removed without causing any fusing with a flare portion and without damaging the surface of an elastic sealing layer, and which can be repeatedly used.

Further, if necessary, resin such as alkyd resin, urethane resin, vinyl acetate resin, polyester resin, silicone resin, or the like; a filler such as alumina, talc, calcium carbonate, graphite, carbon black, titanium oxide, polyethylene powder, silicone rubber powder, or the like; rust preventives; a coupling agent; a tackifier; a leveling agent; or the like; may be added to the sealing material composition according to the present invention. In case where thermoplastic resin such as alkyd resin, urethane resin, vinyl acetate resin, polyester resin and silicone resin is added to the sealing material composition, the amount of the thermoplastic resin is restricted to 1 to 5% relative to the entire weight of the thermosetting resin so as to maintain the heat-resistant property of the elastic sealing layer of the present invention.

In this embodiment explained with reference to FIGS. 1 and 2, the elastic sealing layer 3 is provided on the conical flange 1. However, the present invention should not be restricted thereto or thereby. That is, the elastic sealing layer 3 may be provided on the flared portion 2 in place of the conical flange 1, or on both of the conical flange 1 and the flared portion 2.

EXAMPLE

Production of Sealing Material 30 weight portion of acrylic resin (trade name: KS-786, produced by MITSUBISHI RAYON CO., LTD.) was dissolved in 40 weight portion of toluene, and then, 5 weight portion of polybasic acid resin (trade name: SL-20, produced by OKAMURA OIL MILL, LTD.), 15 weight portion of non-sintered polytetrafluoroethylene powder, and 20 weight portion of sintered polytetrafluoroethylene powder were mixed into the acrylic resin solution. Further, titanium oxide acting as an extender pigment and a surface active agent were added to the mixture, to thereby prepare a pasted sealing material composition.

Production of Test Piece of Conical Flange

The thus prepared sealing material composition was applied onto a conical flange surface of a flare-type pipe joint for a pipe having a diameter of 10 mm and air-dried at a room temperature to thereby obtain a coating having a film thickness of 250 μm. This conical flange was heated at 110° C. for 30 minutes so that the acrylic resin and polybasic acid resin of the sealing material composition were crosslinked to each other.

1. Pressure Resistance Test 10 sets of test pieces having the foregoing conical flange and flare portions were fitted to pipes each having a diameter of 10 mm, and fastened with torque of 45.1N·m {460 kgf·cm}. Next, the connection portion was held for 10 minutes in the state where air pressure of 981 kPa {10 kgf·cm$^2$} was applied into the pipe while being dipped into an air leakage checking liquid. In this state, air leakage was examined with respect to the 10 sets of flare-type pipe joint test pipes. As the comparative example, the same test was performed with respect to a flange surface having no elastic sealing layer. Table 1 shows the measurement results.

2. Oil Resistance Test

Lubricating oil was enclosed into 10 sets of test pipes of the flare-type pipe joint having the same pipe diameter and fastened with the same torque as in the case of the pressure resistance test. Next, the joint portion was held for 10 minutes in the state where air pressure of 981 kPa {10 kgf·cm$^2$} was applied into the pipe while being dipped into an air leakage checking liquid. In this state, leakage of air was examined with respect to the 10 sets of flare-type pipe joint test pipes. As the comparative example, the same test was performed with respect to a flange surface having no elastic sealing layer. Table 1 shows the measurement results.

3. Heat Cycle Test 10 sets of test pipes of the flare-type pipe joint having the same pipe diameter and fastened with the same torque as in the case of the pressure resistance test were left in a heat cycle test machine in which (−30° C.×4 hours)+(120° C.×4 hours) was set as one cycle. After repetition of the heat cycle for 30 times, the joint portion was held for 10 minutes in the state where air pressure of 981 kPa {10 kgf·cm$^2$} was applied into the pipe while being dipped into an air leakage checking liquid. In this state, leakage of air was examined with respect to the 10 sets of flare-type pipe joint test pipes. As the comparison example, the same test was performed with respect to a flange surface having no elastic sealing layer. Table 1 shows the measurement results.

4. Heat Resistance and Repeated Use Property Confirmation Test 10 sets of test pipes of the flare-type pipe joints having the same pipe diameter and fastened with the same torque as in the case of the pressure resistance test were left for 24 hours in an oven in which the temperature was set to be 120° C. After the pipe was cooled to the room temperature, the joint portion was held for 10 minutes in the state where air pressure of 981 kPa {10 kgf·cm$^2$} was applied into the pipe while being dipped into an air leakage checking liquid. In this state, leakage of air was examined with respect to the 10 sets of flare-type pipe joint test pipes. Next, the fastened flare-type pipe joint was released so that the flange surface and the flare portion were separated from each other, and the exterior was examined whether the elastic sealing layer of the flange surface was damaged or not. Further, when the flange surface was turned along the outer periphery of the pipe by 90°, so that the flare portion and the flange surface which were abutted in the foregoing test were assembled with each other with a displacement by 90°, and the pipe was fastened with torque of 45.1N·m {460 kgf·cm} in the same manner as in the preceding examination. The test pipes of flare-type pipe joint in each of which the abutment surface was only displaced by 90°, were left again at 120° C. for 24 hours and then subjected to heat resistance test. Next, leakage of air and existence of damage of the elastic sealing layer of the removed flange surface were examined in the same manner as in the foregoing test. The same test was repeatedly performed for 4 times with respect to the same test pipes of the flare-type pipe joint in the state where the abutment surface was displaced by 90° every time, till the abutment surface was turned by 360°. Table 2 shows the measurement results.

Effects of the Invention

In the flare-type pipe joint according to the present invention, the elastic sealing layer having an excellent restoration rate is provided on the abutment surface and therefore the reliability of sealing effect is considerably improved. Further, since the elastic sealing layer is hardly fused, the sealing layer can be easily removed from the contacting surface without being damaged in the case of disassembly of the joint at the time of inspection or the like. Moreover, the damage or deterioration of the elastic sealing layer of the removed flare-type pipe joint is less, the flare-type pipe joint can be used plural times.

TABLE 1

| Test items | Inventive example | Comparative example |
| --- | --- | --- |
| Pressure resistance test | 0 | 1 |
| Oil resistance test | 0 | 3 |
| Heating cycle test | 1 | 7 |

(Numberical values indicate the number of test pieces from which air leaks out, among 10 sets of test pieces)

TABLE 2

Heat resistance test and Repetition test

| | Number of pieces from which air leaks | External appearance of elastic sealing layer after removed |
| --- | --- | --- |
| Initial setting | 0 | No abnormality were in all the 10 pieces. |
| 90° phase | 0 | No abnormality were in all the 10 pieces. |
| 180° phase | 0 | One elastic sealing layer was damaged. |
| 270° phase | 0 | Further one elastic sealing layer was damaged. (Two elastic sealing layers in total were damaged.) |
| 360° phase | 0 | No new damage was found. (Two elastic sealing layers in total were damaged.) |

What is claimed is:

1. A flare-type pipe joint for sealingly connecting an end of a first pipe and an end of a second pipe together, said joint comprising:
    a flare portion provided on the end of the first pipe;
    a conical flange surface provided on the end of the second pipe;
    an elastic sealing layer provided on one of the flare portion and the conical flange surface, the elastic sealing layer including a thermosetting resin and a curing agent crosslinked to each other, and a fluororesin power; and
    a fixing mechanism to fix the flare portion and the conical flange surface together, such that the elastic sealing layer interposes therebetween.

2. A flare type pipe joint according to claim 1, wherein the fluororesin powder includes non-sintered fluororesin powder.

3. A flare type pipe joint according to claim 1, wherein the thermosetting resin is selected from a group consisting of acrylic resin and epoxy resin.

4. A flare type pipe joint according to claim 1, wherein the elastic sealing layer includes a thermoplastic resin not more than 5% relative to the entire weight of the thermosetting resin.

5. A flare type pipe joint according to claim 1, wherein the elastic sealing layer has thickness which is greater than 200 μm.

6. A flare type pipe joint according to claim 1, wherein the elastic sealing layer includes one of a thermoplastic resin, a filler, a rust inhibitor, a coupling agent, a tackifier, and a leveling agent.

7. A flare-type pipe joint made by a process including the steps of:
    applying a sealing material composition containing a thermosetting resin, a curing agent, and a fluororesin powder onto one of a conical flange surface of a first pipe and a flare portion of a second pipe;

heat treating the applied sealing material composition so that the thermosetting resin and the curing agent form a crosslinking structure to thereby form an elastic sealing layer an the one of the conical flange surface and the flare portion; and connecting the flare portion and the conical flange surface together via a fixing mechanism, such that the elastic sealing layer interposes between the flare portion and conical flange surface.

8. A flare-type pipe joint according to claim 7, wherein a temperature of the heat treating step is less than a sintering temperature of the fluororesin powder.

9. A process for forming a flare-type joint, comprising the steps of:

(a) applying a sealing material composition containing a thermosetting resin, a curing agent, and a fluororesin powder onto one of a conical flange surface of a first pipe and a flare portion of a second pipe;

(b) heat treating the applied sealing material composition so that the thermosetting resin and the curing agent form a crosslinking structure to thereby form an elastic sealing layer on the one of the conical flange surface and the flare portion; and (c) connecting the flare portion and the conical flange surface together via a fixing mechanism, such that the elastic sealing layer interposes between the flare portion and conical flange surface.

10. A process for forming a flare-type joint according to claim 9, wherein the heat treating step (b) is carried out under a first temperature which is lower than a sintering temperature of the fluororesin powder.

11. A process for forming a flare-type joint according to claim 10, wherein the first temperature is within a range from 700° C. to 1300° C.

12. A first pipe sealingly connectable to a flared end portion of a second pipe, said first pipe comprising:

a pipe body;

a conical flange surface provided on an end of said pipe body; and an elastic sealing layer provided on said conical flange surface, said elastic sealing layer including a thermosetting resin and a curing agent crosslinked to each other, and a fluororesin powder.

13. A first pipe according to claim 1, wherein said elastic sealing layer is heated and cured on said conical flange surface.

* * * * *